United States Patent [19]

Woodruff

[11] Patent Number: 4,567,965
[45] Date of Patent: Feb. 4, 1986

[54] PROPELLER BRAKE

[75] Inventor: Frank Woodruff, New Hartford, N.Y.

[73] Assignee: Allied Corporation, Morris Township, Morris County, N.J.

[21] Appl. No.: 360,297

[22] Filed: Mar. 22, 1982

[51] Int. Cl.[4] .................. F16D 63/00; F16D 65/24
[52] U.S. Cl. ............................ 188/68; 188/71.2; 188/170; 192/12 C; 192/18 A; 416/32
[58] Field of Search ............... 188/170, 151 R, 265, 188/71.2, 71.3, 71.5, 71.4, 72.1, 72.3, 68; 244/65; 416/169 R, 32; 60/39.163; 192/13 R, 18 A, 18 R, 12 C, 3.24, 45.1, 70.15

[56] References Cited

U.S. PATENT DOCUMENTS

| 2,141,091 | 12/1938 | Quick | 244/65 |
| 2,407,699 | 9/1946 | Hill | 188/152 |
| 2,737,018 | 3/1956 | Bain | 188/170 |
| 3,618,425 | 11/1971 | Wickman | 192/18 A |
| 3,638,773 | 2/1972 | Lewis et al. | 188/170 |
| 3,770,085 | 11/1973 | Cottingham | 188/170 |
| 3,872,954 | 3/1975 | Nordstrom et al. | 192/18 A |
| 3,891,347 | 6/1975 | Jacobs et al. | 416/32 |
| 4,376,614 | 3/1983 | Woodruff | 188/71.1 |

FOREIGN PATENT DOCUMENTS 798952 7/1958 United Kingdom .
2084663 4/1982 United Kingdom .

Primary Examiner—George E. A. Halvosa
Assistant Examiner—Robert J. Oberleitner
Attorney, Agent, or Firm—Stan Protigal; Howard Massung; Anthony Cuoco

[57] ABSTRACT

A propeller brake for an engine having a propeller shaft includes a housing (10) and a brake shaft (18) rotatably mounted in the housing (10). The brake shaft (18) is coupled to the propeller shaft to rotate therewith. Also included is a brake (64,74) and a lock device (38). The brake (64,74) is mounted in the housing (10) and has a spaced plurality of frictional plates (64) for frictionally resisting rotation of the brake shaft (18). This brake (64,74) is reciprocatable between an operative and an inoperative position. The lock device (38) is mounted in the housing (10) and can reciprocate between an unlocked and locked position. This lock device (38) can, in its locked position, inhibit rotation of the brake shaft (18). The forgoing equipment can stop a propeller shaft by first frictionally coupling the brake (64,74) to the propeller shaft, allowing the coupled portion of the brake (64,74) to rotate therewith. The brake (64,74) may then be actuated to transmit a resisting torque to stop the propeller shaft. Thereafter, the propeller shaft may be positively and mechanically locked with a locking device (38) to prevent further rotation.

12 Claims, 4 Drawing Figures

PROPELLER BRAKE

BACKGROUND OF THE INVENTION

The present invention relates to propeller brakes and methods for braking propellers and propeller shafts.

It is often desirable to stop the propeller of a turboprop engine for various reasons. For example, a propeller can be stopped in the event of an engine failure. Also a pilot may stop the propellers of a commercial turboprop powered aircraft when passengers are boarding or leaving the aircraft, by stopping the engine. However, the resulting thermal cycling of the engine occasioned by the frequent starting and stopping of the engine appreciably reduces engine life. Stopping the engine also requires the use of an auxiliary power unit to provide essential electrical and hydraulic services to the aircraft during the period when the engine or engines are shut down.

From an efficiency point of view, it is desirable to keep engines running while the passengers are boarding or disembarking from an aircraft. However, rotating propellers are highly dangerous to unwary passengers and crew members in the vicinity of the aircraft. Additionally, even in a feathered state, whirling propellers produce objectional wind gusts.

It is known to employ brakes to stop a propeller in the event of an engine failure. These known brakes employ various reciprocating parts such as frustroconical brake drums to frictionally resist shaft rotation. Some propeller brakes employ a plurality of angularly spaced brake shoes. Also known are couplers using helical splines that can disengage the drive to a propeller when torques reach a value indicating that the propeller may be windmilling or that the engine may have failed. Examples of such propeller brakes are disclosed in U.S. Pat. No. 2,141,091; 2,737,018; and 3,225,876.

An important requirement for a propeller brake for large aircraft is high braking power to allow rapid stopping of a relatively large propeller rotating at high angular speed. A disadvantage with known propeller brakes is they ordinarily employ a single, relatively small braking surface. Consequently, these brakes can be easily overloaded or can only stop a propeller after an unacceptably long braking period.

Another important design consideration for propeller brakes is that they fail safe and do not inadvertently brake a propeller during flight or inadvertently release a propeller when its rotation could be dangerous.

Accordingly, there is a need for a compact, efficient and safe propeller brake having high braking power.

SUMMARY OF THE INVENTION

In accordance with the illustrative embodiment demonstrating features and advantages of the present invention, there is provided a propeller brake for an engine having a propeller shaft. The brake includes a brake shaft rotably mounted in a housing. The brake shaft is coupled to the propeller shaft to rotate therewith. The propeller brake also includes a braking means and a lock means. The braking means is mounted in the housing and has a spaced plurality of frictional plates for frictionally resisting rotation of the brake shaft. This braking means is reciprocatable between an operative and inoperative position. The lock means is mounted in the housing and can operate to reciprocate between an unlocked and locked position. This lock means is operable in the locked position to inhibit rotation of the brake shaft.

Also according to a related method of the same invention, a propeller shaft is advantageously stopped with a brake having a first and a second coupler. The method includes the step of frictionally coupling the first coupler to the propeller shaft, allowing the first coupler to rotate therewith. Another step is actuating the brake to transmit a resisting torque from the second to the first coupler to stop the propeller shaft. Another step is positively and mechanically locking the propeller shaft to prevent its rotation.

By employing such apparatus and methods a relatively simple, safe, efficient and compact propeller brake is provided which offers high braking power. In a preferred embodiment, a brake is used which has a series of spaced, stationary frictional plates. Interdigitated therewith are a series of rotating frictional members that can frictionally engage the stationary frictional plates. The rotating frictional members are driven by a drum which can axially move to engage a brake shaft coupled to the propeller shaft. The drum preferably engages the brake shaft through a frustroconical shoe so that the drum driving the moveable members is smoothly accelerated to a speed matching that of the propeller shaft and brake shaft. Once the moveable frictional members are thus brought up to operating speed, further axial thrusting of the drum causes transmission of a braking torque to the brake shaft. Since the braking force is distributed over a plurality of frictional plates, this relatively large surface area can effectively dissipate a high braking power without adverse effect.

Also in a preferred embodiment, a separate locking device engages the brake shaft through locking teeth. This locking device is coaxially mounted in the propeller brake housing and is hydraulically reciprocated into and out of engagement with the brake shaft. Preferably, a spherical latching member in the locking device can be driven through an aperture in the locking device into a corresponding recess in the cavity holding the locking device. A spring-loaded, tapered slider can move within the locking device over the spherical member and hold it in an extended position thereby securely holding the locking device in an unlocked condition so that propeller rotation is not inhibited.

A preferred embodiment also uses various spring members to bias various components into positions that enhance their fail safe properties. Furthermore, the use of latching valves for transmitting hydraulic pressure is preferred to ensure that failure of electrical power does not cause inadvertent, improper operation.

BRIEF DESCRIPTION OF THE DRAWING

The above brief description as well as other objects, features and advantages of the present invention will be more fully appreciated by reference to the following detailed description of a presently preferred but nonetheless illustrative embodiment in accordance with the present invention when taken in conjunction with the accompanying drawings wherein.

DETAILED DESCRIPTION OF THE PREFERRED EMBODIMENT

Figure 1:
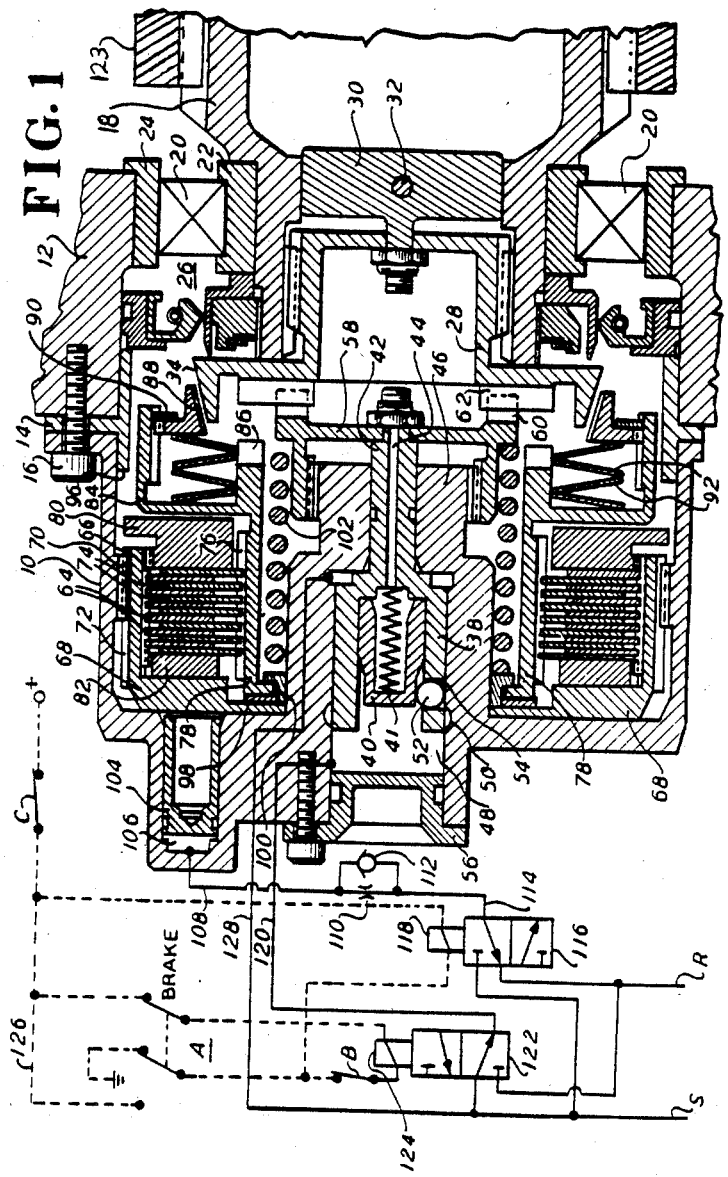
FIG. 1 is a cross-sectional view through the axis of a propeller brake constructed according to the principles of the present invention.

Referring to FIG. 1, the illustrated propeller brake has a generally cylindrical housing 10 attached to structure 12 which may be part of the air frame or the aircraft engine. Housing 10 and its flanged annulus 14 (also part of the housing) are secured to structure 12 by means of a plurality of angularly spaced bolts, the one visible herein being bolt 16.

A brake shaft is shown herein as hollow gear 18 supported through its hollow drive shaft by ball bearing 20, having inner race 22 and outer race 24. A fluid and grease sealing assembly 26 is generally illustrated as an annular assemblage mounted between structure 12 and the hollow drive shaft of brake shaft 18. Internal splines on hollow shaft 18 engage external splines on a shoe 28. Shoe 28 and shaft 18 are secured together through a hub 30 having a pin 32 piercing both hub 30 and brake shaft 18. A coaxial stud on hub 30 is secured to shoe 28 by a nut. Shoe 28 is in the form of a cup having an annular flange terminating in a frustro-conical surface 34.

A lock means is shown herein as piston 38 containing in a coaxial open cavity a generally cylindrical, tapered slider 40. Piston 38 has a forwardly extending boss 42 terminating in a threaded stud. Mounted within a bore in slider 40 is a resilient means, shown herein as a helical compression spring 41 that bears against the internal face of piston 38. This face and thus the space between slider 40 and piston 38 is vented by a coaxial bore 44 that extends through the stud of boss 42. Piston 38, shown in its locked position, is slidably mounted in piston cavity 48 formed in boss 46 of housing 10. Cavity 48 has a stepped cylindrical shape and has an annular latching recess 50. Piston 38 includes a latch, comprising slider 40 and a latching member, shown herein as a plurality of spherical members, the one visible identified herein as ball 52. Ball 52 is mounted in transverse aperture 54 of piston 38. Piston cavity 48 has its outer side closed by a plug 56 bolted thereto.

Attached to the stud of boss 42 is a disc 58 having on its forward face a peripheral set of spaced teeth 60 positioned to engage matching teeth 62 on the opposing face of shoe 28. Internal splines on the rearwardly extending drum of disc 58 engage external splines on boss 46 of housing 10. These splines prevent rotation of disc 58 so when piston 38 is in the illustrated locked position, teeth 60 of disc 58 engage teeth 62 and prevent rotation of brake shaft 18.

A braking means, illustrated herein in its inoperative position, includes a plurality of frictional plates 64. Plates 64 are washer-like devices whose peripheral notches engage a second coupler, shown herein as splines 66. Splines 66 are part of a non-rotating drum 68 mounted within housing 10. The external splines 72 of drum 68 engage internal splines 70 of housing 10 and prevent rotation of drum 68. The braking means also employs a plurality of moveable frictional members 74, interdigitated with plates 64. Members 74 can be rotated by a first coupler 76, which is a plurality of external splines on drum 78. Frictional elements 64 and 74 are located between two axially spaced, non-rotating, annular drive members 80 and 82. Members 80 and 82 both have external splines engaging the internal splines 66 to prevent rotation. Also, the outwardly extending flange on drive member 80 extends radially to almost touch the inside wall of housing 10. Drive members 80 and 82 are located between drum 68 and the annular channel 84 formed in the end of drum 78 adjacent to brake shoe 28. The inner wall of channel 84 includes a plurality of teeth 86 arranged to engage teeth 62 of shoe 28.

Annular drum 88 has an internal, frustro-conical surface with a plurality of gripping teeth arranged to engage surface 34. The external splines on drum 88 are sized to fit within and engage internal splines in the outermost wall of channel 84. Snap ring 90, mounted on the splines of annular channel 84, keeps drum 88 within the channel. Drum 88 is biased toward snap ring 90 in this view by four Belleville-type spring washers 92.

Annulus 14 of housing 10 forms an abutment 96 which extends into housing 10 radially past the perimeter of the flange of member 80. As explained in further detail hereinafter, abutment 96 is used to actuate the braking means. The inner edge of drum 68 has mounted in front of it a coaxial, frictionless washer 98. Lying concentrically within frictionless washer 98 is a bushing 100 having a forward, outwardly extending flange. Located between this flange of bushing 100 and the frictionless washer 98, is the radially and inwardly directed flange on the back end of drum 78. Drums 68 and 78 are urged to the position illustrated herein by bushing 100 which is in turn biased by the yieldable means shown herein as helical compression spring 102. Spring 102 also bears against the perimeter of disc 58.

A thrust means is disclosed herein as a plurality of angularly spaced pistons, piston 104 being visible in this view. Piston 104 is slidably mounted within cylindrical cavity 106 in housing 10 and can be driven therein by hydraulic pressure applied along line 108 through a delay means, shown herein as restriction 110 in line 108. Hydraulically coupled in parallel with restriction 110 is a check valve for allowing immediate reverse flow out of cavity 106. Restriction 110 is connected between line 108 and common line 114 of electrically operated valve 116. Valve 116 has a solenoid 118 for alternately connecting common line 114 to either pressure source S or a return line R.

Piston cavity 48 is connected through line 120 to a displacement means shownn herein as electrically operated latching valve 122. Common line 120 can be connected by valve 122 to either return line R or pressure source S.

A first sensing means is shown herein as switch C which closes when the angular speed of the propeller shaft 123 or brake shaft 18 descends below a predetermined idling speed. Switch C is connected between a source of positive potential and one terminal (line 126) of solenoid 118. Its other terminal is connected to one pole of a double pole, double throw main switch A.

A second sensing means is shown herein as switch B which closes when the propeller shaft (not shown) or brake shaft 18 stops rotating. Switch B and solenoid 124 are serially connected between the poles of switch B, switch B connecting directly to the junction of solenoid 118 and switch A. Switch A is connected as a reversing switch so that ground and line 126 can be electrically reversed and connect to either one of the poles of switch A. Were positive potential applied to line 126 and switch A reversed from the illustrated position, valve 122 would change positions and stably remain in that position until the voltage on solenoid 124 reversed. Pressure source S is connected to piston cavity 48 through line 128 but at the end opposite to that of line 120.

To facilitate an understanding of the principles associated with the foregoing apparatus, its operation will now be briefly described. Initially, the aircraft (not shown) is on the ground with all power systems off so that there is no pressure differential between source S and return R and no energizing potential on line 126. Under these circumstances, valves 116 and 122 will remain in the positions illustrated in FIG. 1, especially in view of the fact that valve 122 is a latching valve. Under the urging of spring 102, locking piston 38 has driven teeth 60 into teeth 62 of brake shoe 28 so that brake shaft 18 cannot rotate (because disc 58 and teeth 60 cannot rotate). Correspondingly, the propeller shaft 123 being mechanically coupled to brake shaft 18, also cannot turn. This feature is especially useful when the aircraft is parked so that the propellers do not inadvertently windmill to cause wear and possible damage to the propeller apparatus or its associated engines.

Figure 2:
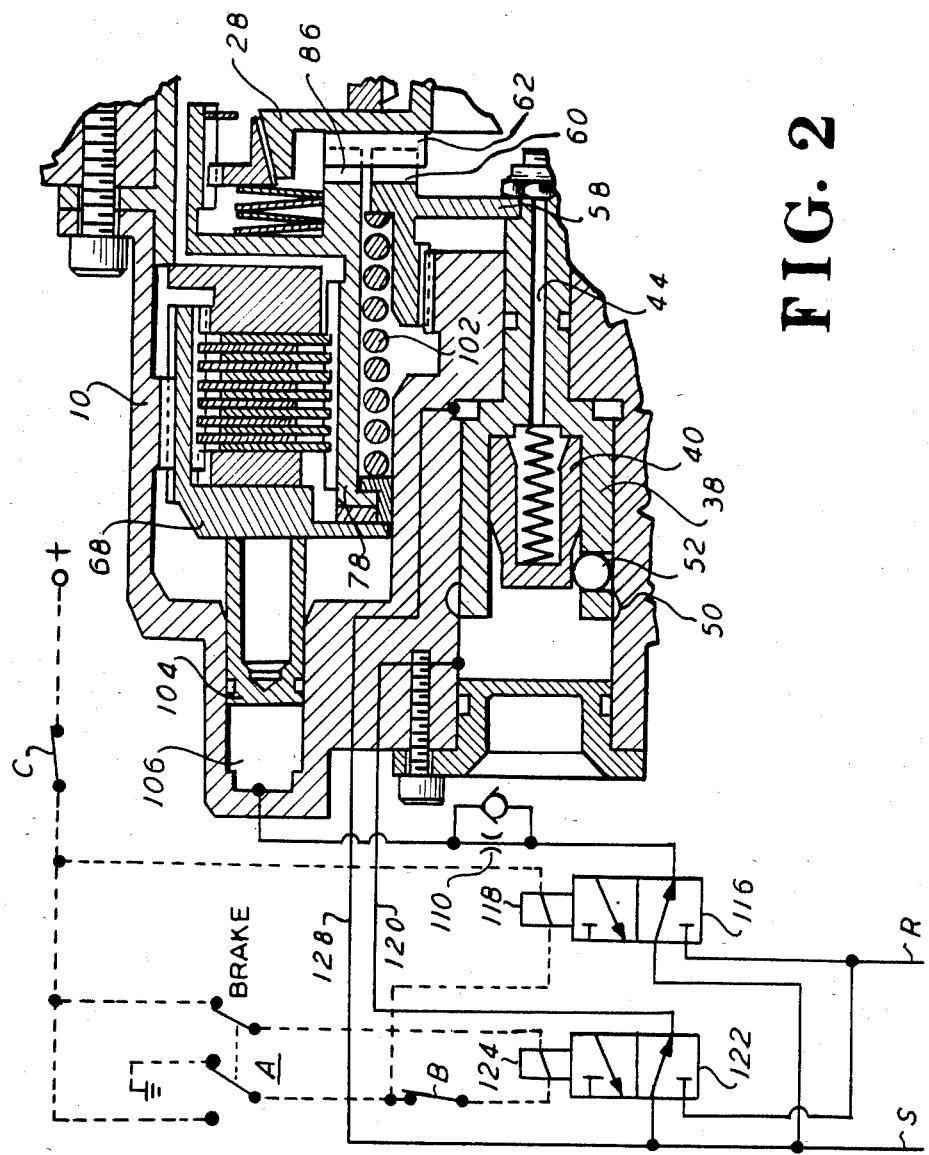
FIG. 2 is a partial, cross-sectional view of the brake of FIG. 1, showing the clutch means in an operative position and the lock means in a locked condition.
Figure 3:
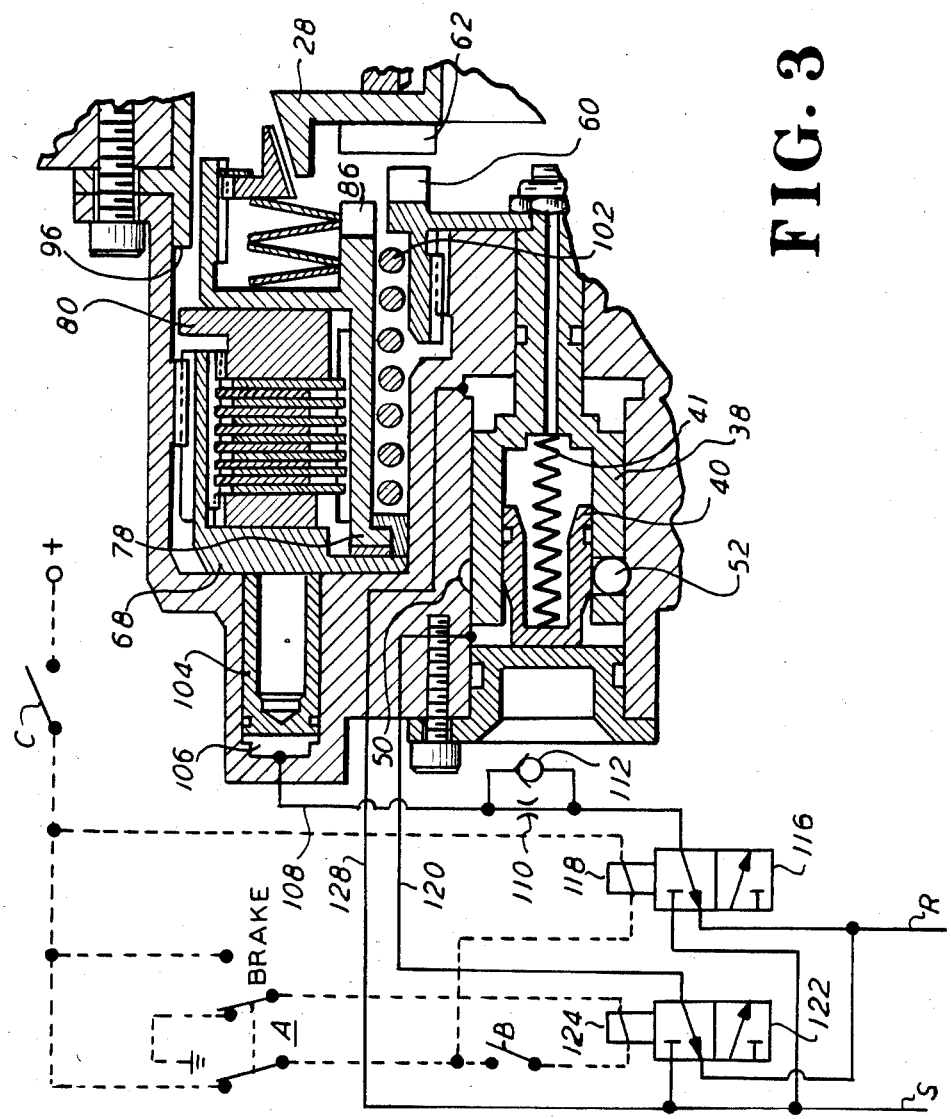
FIG. 3 is a partial, cross-sectional view of the brake of FIG. 1, showing the brake released as would normally occur during flight or taxiing.

When the engine is started, line 126 is energized. Since switch B is closed (propellers stopped) solenoid 124 is energized but without further effect, since valve 124 is already in the appropriate one of its stable positions. The rise of hydraulic pressure as the engine runs is without further effect since it merely applies pressure through line 120 to one side of piston 38, the other side being already connected to pressure source S through line 128. Thus no net force is applied to piston 38 by the hydraulic system. Consequently, compression spring 102 keeps piston 38 in the locked position illustrated in FIG. 2. Also, the application of potential through switches C and A to solenoid 118 causes valve 116 to transfer as illustrated in FIG. 2. Therefore pressure source S is applied through restriction 110 to cavity 106. As a result, piston 104 and drums 68 and 78 are driven to the illustrated positions, without further effect. Next, the pilot can release the brake by transferring switch A as illustrated in FIG. 3. Consequently, power is removed from solenoid 118 causing valve 116 to return to the illustrated position. Therefore, cavity 106 is quickly depressurized due to the rapid action of check valve 112 bypassing restriction 110. Accordingly, compression spring 102 rapidly retracts drums 78 and 68 and thus piston 104 to the positions illustrated in FIG. 3. Consequently, drum 78 disengages shoe 28.

Also, the transfer of switch A transfers valve 122. Therefore line 120 is connected to return line R so that the higher pressure applied along line 128 retracts piston 38 to the position illustrated, thereby compressing spring 102. In doing this, teeth 60 disengage and free teeth 62. When piston 38 retracts, ball 52 can project through the aperture in the wall of piston 38 and engage recess 50. This projection is facilitated by spring 41 moving tapered slider 40 outwardly so its larger diameter holds ball 52 in the position illustrated. Under these circumstances, piston 38 cannot return to its prior locked position unless slider 40 and ball 52 are retracted.

With piston 38 and drum 78 retracted, shoe 28 is no longer restrained. Accordingly, the associated brake shaft 18 (FIG. 1) is free to rotate. Therefore the pilot may increase engine speed to spin the propellers and thus the aircraft may taxi and fly.

Figure 4:
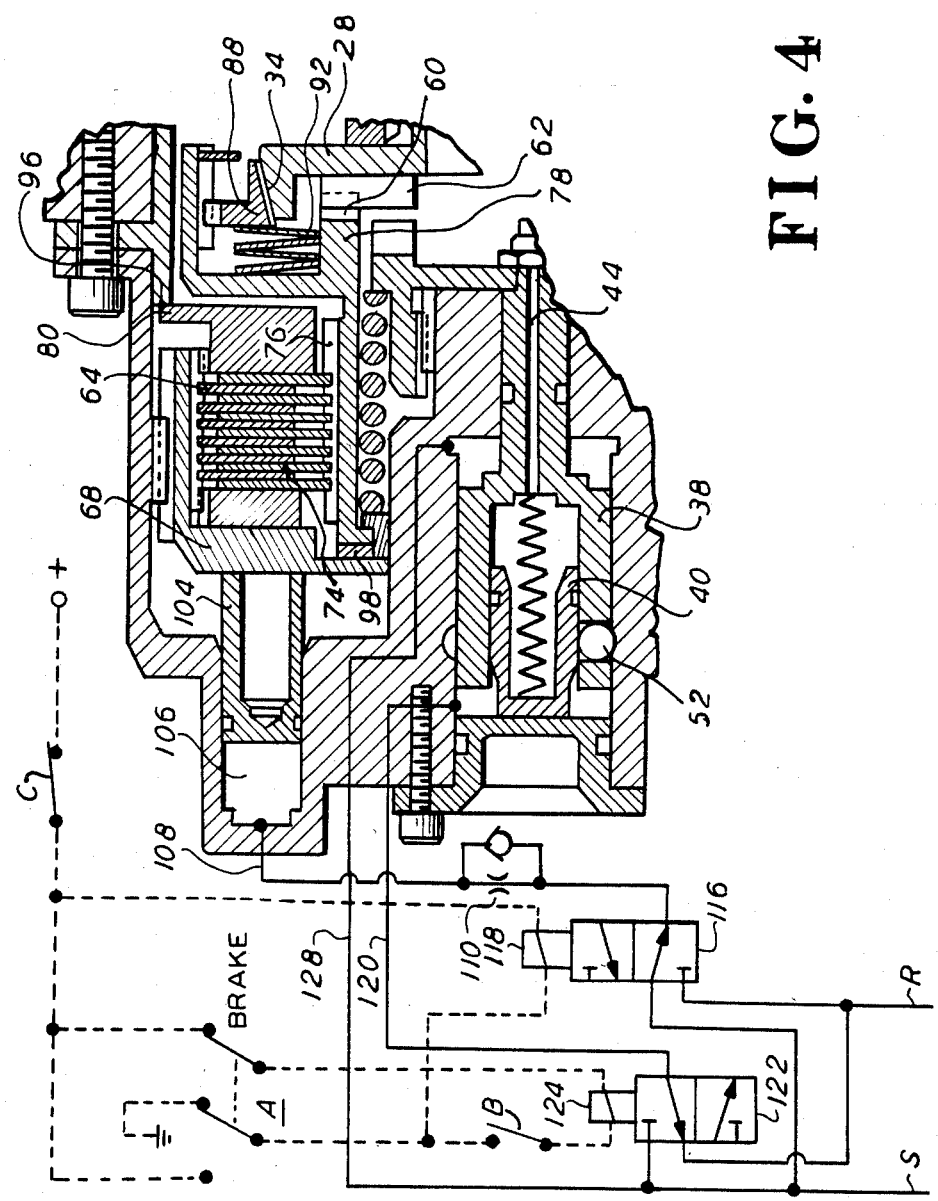
FIG. 4 is a partial, cross-sectional view of the brake of FIG. 1 showing the clutch means in an operative position and the lock means in an unlocked position.

Upon landing the aircraft and before discharging passengers, the pilot may transfer switch A as illustrated in FIG. 4. Thereafter he may reduce engine speed so that the propellers spin at an idle velocity. Accordingly, switch C closes and as a result, solenoid 118 is actuated to transfer valve 116 to the position illustrated in FIG. 4. Consequently, pressure source S is coupled through restriction 110 to line 108 thereby pressurizing cavity 106 gradually. As a result, piston 104 is gradually driven to the right. The first relevant occurrence is drum 88 engaging surface 34 of shoe 28. An axial force thus applied to drum 88 is transferred back through Belleville-type springs 92 acting on drum 78, frictionless washer 98 and drum 68. This axial force also applies a torque to drum 78 and it commences rotation, slipping across frictionless washer 98. Since drum 78 and its splines 76 start rotating, clutch members 74 rotate synchronously therewith. However, until member 80 reaches abutment 96, no compressive force exists between member 80 and drum 68. Accordingly, frictional members 74 do not yet produce a significant restraining force. Moreover, restriction 110 limits the axial speed of drum 78, so teeth 62 and 86 do not engage until after drum 78 is spinning synchrously with shaft 18. Eventually teeth 86 of drum 78 reach and engage teeth 62 of shoe 28, ensuring that shoe 28 (and thus brake shaft 18 of FIG. 1) and drum 78 rotate synchrously.

Eventually, piston 104 drives member 80 into abutment 96, as shown in FIG. 4, thereby compressing frictional members 74 and plates 64 together. Since plates 64 cannot rotate, being held in the splines of drum 68, a frictional braking force is applied to drum 78. This braking force gradually stops shoe 28 and shaft 18 over the course of 2 or 3 seconds (although other delay intervals can be chosen depending on clutch design).

When the propeller stops, speed sensitive switch B closes and valve 122 transfers from the position shown in FIG. 4. As a result, line 120 is connected to pressure source S so that the same pressure is applied through lines 120 and 128 to both sides of piston 38. Since the space between slider 40 and piston 38 is vented by bore 44, slider 40 retracts into piston 38 as illustrated in FIG. 2. This allows ball 52 to leave recess 50 so that piston 38 is no longer retained.

With equal pressure already on both sides of piston 38, its larger rear surface area (aided by compression spring 102), drives piston 38 to the position shown in FIG. 2, causing teeth 60 to re-engage teeth 62. Consequently, brake shaft 18 (FIG. 1) is locked and can no longer rotate.

If the aircraft engine is now shut down, pressure is released from cavity 106 so that piston 104 retracts under the action of compression spring 102, to the position shown in FIG. 1. Therefore, the system returns to the condition illustrated in FIG. 1 thereby completing one operating cycle of the propeller brake.

It is to be appreciated that various modifications may be implemented with respect to the above described preferred embodiment. For example, various materials may be used including plastics, steels and various metallic and other materials. Also, the number of plates and frictional members may be changed from the number shown herein. Furthermore, while hydraulic actuation is shown in many instances, electromechanical actuation may be used instead. Moreover, the type of valves used can be latching or non-latching, depending upon the application. While a specific holding device employing a spherical latch is illustrated, it will be appreciated that other arrangements including pivoted latching devices on various types of sliders may be employed. In addition the various speeds at which the speed sensitive switches are operated can be altered depending upon the specific aircraft. Also the sizes and proportions of the various components can be altered depending upon space available and the desired brake power, operating temperature range, reliability, strength, speed etc. While locking teeth are shown on various components, they may be eliminated or replaced with alternate locking members. Similarly the form of springs used to urge various members can be changed.

Obviously, many modifications and variations of the present invention are possible in light of the above teachings. It is therefore to be understood that within the scope of the appended claims, the invention may be practiced otherwise than as specifically described.

What is claimed is:

1. A propeller brake for an engine having a propeller comprising:
   a housing;
   a propeller shaft connected to said propeller;
   a brake shaft rotatably mounted in said housing and coupled to said propeller shaft to rotate therewith;
   means for braking said propeller shaft, said braking means including a plurality of moveable frictional members rotatably mounted in said housing, and having a spaced plurality of frictional plates integrated with said frictional members, said braking means reciprocating between an operative and inoperative position, and said frictional plates being non-rotating;
   a drum rotatably mounted in said housing for rotating said moveable frictional members, said drum being axially thrustable to frictionally engage said brake shaft and rotate therewith;
   lock means mounted in said housing and operable to reciprocate between an unlocked and locked position, said lock means being operable in said locked position to inhibit rotation of said brake shaft;
   thrust means for thrusting said drum into engagement with said brake shaft, said thrust means being operable to compress said moveable plates and said frictional plates after said drum engages said brake shaft;
   yieldable means for urging said drum away from said brake shaft; and
   said drum including a frustro-conical surface and said brake shaft including a frusto-conical shoe sized to match said frustconical surface of said drum upon engagement of said drum and said brake shaft.

2. A propeller brake according to claim 1 wherein said lock means comprises:
   a piston slidably mounted in said housing to reciprocate between said locked and unlocked position; and
   a latch mounted on said piston for holding it in its unlocked position.

3. A propeller brake according to claim 2 wherein said housing has a piston cavity sized to fit said piston, said latch including:
   a tapered slider centrally mounted in said piston for longitudinal reciprocation therein, said piston having a transverse aperture, said piston cavity having a latching recess alignable with said transverse aperture upon said piston reaching a predetermined position; and
   a latching member mounted in said transverse aperture and sized to fit within said piston when said slider is fully retracted, said latching member being outwardly thrustable into said latching recess by outward motion of said slider in said piston.

4. A propeller brake according to claim 3 comprising:
   resilient means for outwardly urging said slider from said piston.

5. A propeller brake according to claim 1 wherein said housing includes an abutment, said frictional plates and said frictional members being positioned between said abutment and said thrust means, the latter being operable to compress said plates and members against said abutment after thrusting said drum into engagement with said brake shaft.

6. A propeller brake according to claim 1 further comprising:
   first sensing means coupled to said propeller shaft for providing a first signal in response to the angular velocity of said propeller shaft being less than a predetermined first magnitude;
   second sensing means coupled to said propeller shaft for providing a second signal in response to the angular velocity of said propeller shaft being less than a predetermined second magnitude, said first magnitude exceeding said second magnitude;
   thrust means connected to said first sensing means for urging said braking means into its operative position in response to said first signal; and
   displacement means connected to said second sensing means for urging said lock means into its locked position in response to said second signal.

7. A propeller brake according to claim 6 wherein said displacement means is operable to move said lock means into its unlocked position, said lock means including:
   a latch for mechanically holding said lock means in its unlocked position without assistance from said displacement means.

8. A propeller brake according to claim 7 wherein said displacement means includes:
   a pressure source; and
   an electrically operable, two position, latching valve coupled between said source and said lock means for moving the latter, said valve being bistabilized to refrain from changing its position upon the removal of electrical potential across it.

9. A propeller brake according to claim 7, or 8 or 1 further comprising:
   yieldable means for urging said braking means to its inoperative position and said lock means to its locked position.

10. A propeller brake according to claim 7 or 8 further comprising:
    yieldable means for urging said lock means to its locked position.

11. A propeller brake according to claim 6 wherein said thrust means includes delay means for gradually causing urging of said braking means into its operative position over a predetermined time interval.

12. A propeller brake according to claim 6 wherein said lock means comprises:
    a piston slidably mounted in said housing to reciprocate between said locked and unlocked position; and
    a latch mounted on said piston for holding it in its unlocked position.

* * * * *